(No Model.)
C. BECKER.
COOKING APPARATUS.
No. 348,821. Patented Sept. 7, 1886.
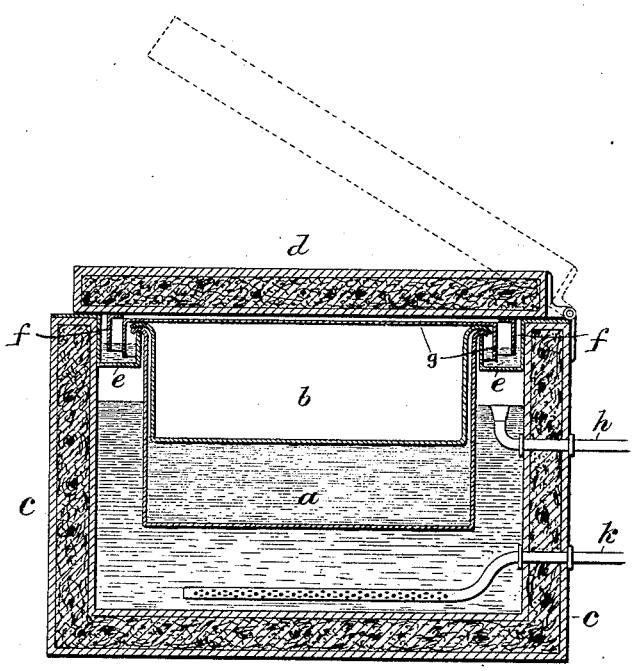
Attest.
Geo. T. Smallwood,
L. M. Hopkins.
Inventor:
Carl Becker.
By Knight Bros.
attys.

UNITED STATES PATENT OFFICE.

CARL BECKER, OF BERLIN, GERMANY.

COOKING APPARATUS.

SPECIFICATION forming part of Letters Patent No. 348,821, dated September 7, 1886.

Application filed June 1, 1885. Serial No. 167,281. (No model.) Patented in Spain March 6, 1885, No. 6,627.

*To all whom it may concern:*

Be it known that I, CARL BECKER, a subject of the King of Prussia, and residing in Berlin, Kingdom of Prussia, Germany, have invented new and useful Improvements in Cooking Apparatus, of which the following is a specification.

My invention relates to apparatus for cooking food in a closed water bath; and it consists in the means employed for carrying out a process of baking or roasting simultaneously with that of boiling in the same apparatus, and for producing a perfect hydraulic seal between the receptacle containing the water for the bath and the cover or covers thereof.

On the annexed sheet of drawing an apparatus to which my improvements are applied is shown in vertical section.

The apparatus consists, principally, of a receptacle, $c$, adapted to contain the water serving as water bath, and provided with a cover, $d$, of the main cooking vessel or boiler $a$, and of a pipe, $k$, by which steam may be admitted into $c$ for heating the water. The receptacle $c$ and its cover $d$ are protected by bad conductors of heat against cooling and undue variations of temperature. Preferably they are made with double walls of metal, between which there is a filling of cork. $h$ is an overflow-pipe serving to keep the level of the water in $c$ uniform. The means by which the hydraulic seal of the cover $d$ is obtained will be described hereinafter.

For the purpose of cooking soup, vegetables, and the like it is advantageous to employ deep vessels, such as the vessel $a$, whereas the roasting of meat and the baking of pastry, &c., are preferably carried out in shallow vessels or pans, because in these the heat will act more uniformly on the articles to be treated. Now, by inserting a pan, $b$, into the vessel or pot $a$, as shown by the drawing, and keeping the liquid in $a$ high enough to be in contact with the lower part of $b$, a combination of cooking-vessels is obtained by means of which the two processes of baking or roasting and of boiling may be carried out simultaneously in one apparatus, the pan $b$ serving for the former, the vessel $a$ for the latter, purpose.

In order to produce the hydraulic seal of the cover $d$, the receptacle $c$ is provided on the inside, near its upper edge, with a gutter, $e$, adapted to contain water, and to the cover $d$ is tightly fitted a rim, $f$, projecting downward, so as to dip into the water in $e$. For further security against an evaporation of the volatile constituents of the articles to be cooked, a cover, $g$, may be placed inside of the cover $d$ over the vessels $a$ and $b$, the rim of the said cover $g$ also dipping into the water contained in the gutter $e$. The vessel $a$ may be made removable from the receptacle $c$, or it may be fixed thereto. Besides, two or more pairs of vessels, $a$ and $b$, may be placed into one receptacle $c$.

I claim as my invention—

1. The combination, with a receptacle, $c$, having a cover, $d$, of a gutter, $e$, arranged within the receptacle near the top edge thereof, adapted to contain water, cooking-vessel $a$, suspended on the gutter, and the baking and roasting pan $b$, suspended on the gutter within the cooking-vessel, substantially as described.

2. The combination, with a receptacle, $c$, having a cover, $d$, of the gutter $e$, secured within the receptacle near the top edge thereof, the vessels $a$ and $b$, suspended from the gutter, and the cover $g$, dipping into the gutter, substantially as described.

3. The combination, with a receptacle, $c$, having a cover, $d$, of a gutter, $e$, arranged within the receptacle near the top edge thereof, adapted to contain water, cooking-vessel $a$, suspended on the gutter, baking and roasting pan $b$, suspended on the gutter within the cooking-vessel, and a rim, $f$, secured to the cover and dipping into the gutter, substantially as described.

4. The combination, with a receptacle, $c$, having a cover, $d$, of the gutter $e$, secured within the receptacle near the top edge thereof, the vessels $a$ and $b$, suspended from the gutter, the cover $g$, dipping into the gutter, and a rim, $f$, secured to the cover of the receptacle and dipping into the gutter, substantially as described.

5. The combination of the receptacle $c$ for containing water, having a cover, $d$, steam-pipe $k$, overflow-pipe $h$, and gutter $e$, cooking-vessel $a$, roasting-vessel $b$, inner cover, $g$, and rim $f$, the inner cover and rim dipping into the gutter, substantially as set forth.

In testimony whereof I have signed my name to this specification in the presence of two subscribing witnesses.

CARL BECKER.

Witnesses:
ARNOLD ERBSTAT,
  *Stainforth Road, Walthamstow, Merchant's Clerk.*
SYDNEY CLARKE HOOK,
  *50 Gresham House, Old Broad St., London, Notary's Clerk.*